(12) United States Patent
Fourcand

(10) Patent No.: US 8,842,530 B2
(45) Date of Patent: Sep. 23, 2014

(54) DETERMINISTIC PLACEMENT OF TIMESTAMP PACKETS USING A PERIODIC GAP

(75) Inventor: Serge Francois Fourcand, Fairview, TX (US)

(73) Assignee: Futurewei Technologies, Inc., Plano, TX (US)

(*) Notice: Subject to any disclaimer, the term of this patent is extended or adjusted under 35 U.S.C. 154(b) by 574 days.

(21) Appl. No.: 13/176,805

(22) Filed: Jul. 6, 2011

(65) Prior Publication Data

US 2012/0008646 A1   Jan. 12, 2012

Related U.S. Application Data

(60) Provisional application No. 61/362,074, filed on Jul. 7, 2010.

(51) Int. Cl.
H04L 12/26 (2006.01)
H04J 3/06 (2006.01)

(52) U.S. Cl.
CPC ............ *H04J 3/0667* (2013.01); *H04J 3/0673* (2013.01)
USPC ........................................ 370/230

(58) Field of Classification Search
USPC .................. 370/341–463, 229–254
See application file for complete search history.

(56) References Cited

U.S. PATENT DOCUMENTS

| 6,247,058 | B1  |   | 6/2001  | Miller et al. |
| 6,272,131 | B1  | * | 8/2001  | Ofek ............................ 370/389 |
| 6,404,770 | B1  | * | 6/2002  | Fujimori et al. ............. 370/429 |
| 6,477,181 | B1  | * | 11/2002 | Fujimori et al. ............. 370/476 |
| 6,654,345 | B1  |   | 11/2003 | Chiussi et al. |
| 7,486,693 | B2  | * | 2/2009  | Walter et al. .................. 370/437 |
| 2008/0075019 | A1 | * | 3/2008 | Petras .......................... 370/254 |
| 2008/0137679 | A1 |   | 6/2008 | Horst et al. |
| 2008/0139212 | A1 |   | 6/2008 | Cheng et al. |

FOREIGN PATENT DOCUMENTS

| CN | 101111826 A | 1/2008 |
| CN | 101527687 A | 9/2009 |
| CN | 101595683 A | 12/2009 |
| EP | 1630979 A1 | 3/2006 |
| EP | 1921783 A1 | 5/2008 |

OTHER PUBLICATIONS

"Draft Standard for a Precision Clock Synchronization Protocol for Networked Measurement and Control Systems," IEEE Instrumentation and Measurement Society, IEEE 1588™, Jul. 24, 2008, 289 pages.

(Continued)

*Primary Examiner* — Kwang B Yao
*Assistant Examiner* — Juvena Loo
(74) *Attorney, Agent, or Firm* — Conley Rose, P.C.; Grant Rodolph; William H. Dietrich

(57) ABSTRACT

An apparatus comprising a timestamp support logic component configured to identify a plurality of timestamps for a plurality of network nodes on a single link and align the timestamps in a plurality of corresponding time slots for the network nodes within a periodic transmission time window and a scheduler coupled to the timestamp support logic component and configured to align a plurality of packets that do not comprise timestamps in a corresponding time slot subsequent to the time slots for the timestamps in the periodic transmission time window.

21 Claims, 8 Drawing Sheets

(56) References Cited

OTHER PUBLICATIONS

"Information Technology—Telecommunications and Information Exchange Between Systems-Local and Metropolitan Area Networks-Specific Requirements-Part 3: Carrier Sense Multiple Access with Collision Detection (CSMA/CD) Access Method and Physical Layer Specifications," IEEE 802.3, 2005, 417 pages.
Foreign Communication From A Counterpart Application, Application No. 2012524002, Japanese Office Action dated Feb. 5, 2013, 2 pages.
Foreign Communication From A Counterpart Application, Application No. 2012524002, English Translation of Japanese Office Action dated Feb. 5, 2013, 2 pages.
Foreign Communication From A Counterpart Application, PCT Application PCT/US2011/043014, International Search Report dated Nov. 21, 2011, 3 pages.
Foreign Communication From A Counterpart Application, PCT Application PCT/US2011/043014, Written Opinion dated Nov. 21, 2011, 5 pages.
Foreign Communication From A Counterpart Application, Chinese Application No. 201180001695.X, Chinese Search Report dated Dec. 23, 2013, 2 pages.
Foreign Communication From A Counterpart Application, Chinese Application No. 201180001695.X, Chinese Office Action dated Jan. 3, 2014, 9 pages.
Foreign Communication From A Counterpart Application, Canadian Application No. 2760621, Canadian Office Action dated Feb. 18, 2014, 8 pages.

* cited by examiner

DETERMINISTIC PLACEMENT OF TIMESTAMP PACKETS USING A PERIODIC GAP

CROSS-REFERENCE TO RELATED APPLICATIONS

The present application claims priority to U.S. Provisional Patent Application No. 61/362,074, filed Jul. 7, 2010 by Serge Fourcand and entitled "Deterministic Placement of Timestamp Packets Using a Periodic Gap," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Ethernet is the preferred protocol for many types of networks because it is flexible, decentralized, and scalable. Ethernet comprises a family of frame-based computer networking technologies for local area networks (LANs), and defines a number of wiring and signaling standards for the Physical Layer of the Open Systems Interconnection (OSI) networking model and a common addressing format and Media Access Control (MAC) at the Data Link Layer. Ethernet is flexible in that it allows variable-sized data packets to be transported across different types of mediums using various nodes each having different transmission speeds. In many networks, such as Ethernet networks, the nodes synchronize their transmissions by exchanging a plurality of timing references or timestamps.

SUMMARY

In one aspect, the disclosure includes an apparatus comprising a timestamp support logic component configured to identify a plurality of timestamps for a plurality of network nodes on a single link and align the timestamps in a plurality of corresponding time slots for the network nodes within a periodic transmission time window and a scheduler coupled to the timestamp support logic component and configured to align a plurality of packets that do not comprise timestamps in a corresponding time slot subsequent to the time slots for the timestamps in the periodic transmission time window.

In another aspect, the disclosure includes a network component comprising a receiver configured to receive a plurality of timestamp packets and a plurality of non-timestamp packets, a periodic timestamp transmission support logic unit configured to determine a buffer time for each of the timestamp packets in which to align each of the timestamp packets at a position in a periodic transmission time window designated for a corresponding network node on the same link, a scheduler configured to determine a buffer time to hold the non-timestamp packets until all the timestamp packets are transmitted, a buffer configured to hold each of the timestamp packets and the non-timestamp packets until the corresponding determined buffer time expires, and a transmitter configured to transmit the timestamp packets and the non-timestamp packets after the corresponding buffer time expires on the same link.

In a third aspect, the disclosure includes a network apparatus implemented method comprising receiving a plurality of Ethernet packets comprising timestamp packets and other packets, identifying and mapping each of the timestamp packets to a corresponding designated network node on the same egress link, buffering each of the Ethernet packets for a determined time to align the Ethernet packets within a plurality of corresponding time slots in a virtual periodic time window for transmission, and transmitting each of the Ethernet packets after the determined time expires.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques described below, including the exemplary designs and implementations illustrated and described herein, but may be modified within the scope of the appended claims along with their full scope of equivalents.

Synchronous operation of geographically distributed network nodes, such as for Ethernet networks, is typically performed by distributing timing references to the various nodes, e.g., using a single frequency domain. Timing references may be distributed in a star fashion, e.g., from a single point to all the network nodes to be synchronized. However, this approach may require the deployment, operation, and maintenance of an extensive clock distribution network that is separate and parallel to the network transporting the actual bearer traffic. To avoid such duplication of network infrastructure, it is desirable to distribute timing references over the same network that is transporting the bearer traffic. Such a distribution approach may require cascading the clock references from network node to network node, where each network node acts as a repeater, since a full point-to-multipoint inter-connectivity of these network nodes is typically not implemented.

To support the distribution and synchronization of timing references over packet-mode networks that may exhibit different Layer 1 characteristics, it is further desirable to perform the synchronization and distribution of timing references using timestamps transported at Layer 2. An example of such a Layer two (Layer 2) timestamp-based scheme is described in the Institute of Electrical and Electronics Engineers (IEEE) standard 1588, which is incorporated herein by reference. In IEEE 1588 and similar other timestamp-based schemes, distribution and synchronization of both frequency and phase is possible. Typically, the use of forwarded timestamps only is sufficient for frequency synchronization. However, a phase synchronization may require a closed-loop scheme where the round-trip of the timestamp is measured and then divided by two to derive a transport delay offset that is used to adjust the phase at the destination to provide phase alignment of multiple nodes within a network.

Figure 1:
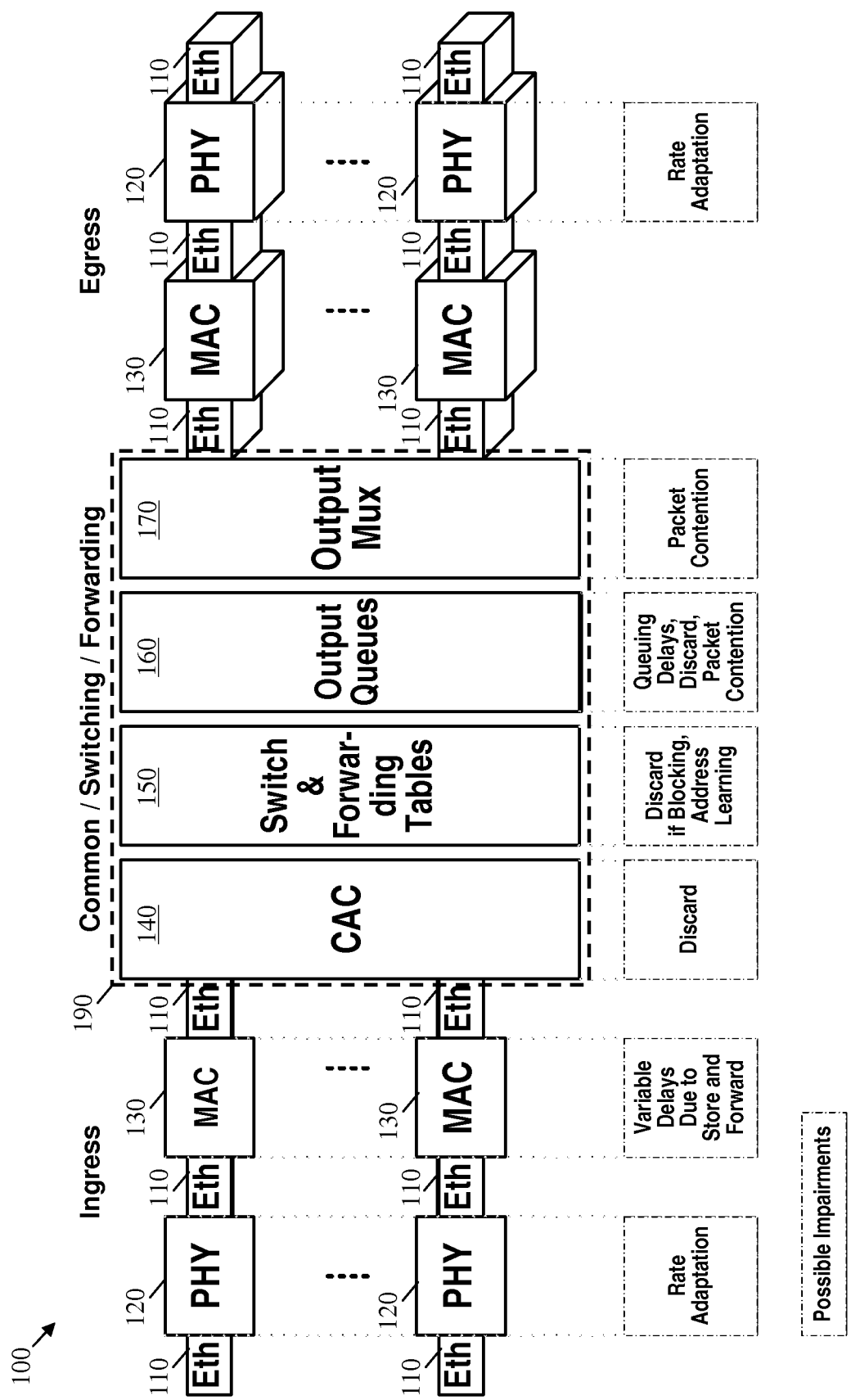
FIG. 1 is a schematic diagram of an embodiment of a network node.

FIG. 1 illustrates an embodiment of a network node 100 that may forward a plurality of timestamps in a network, e.g., using the Layer 2 timestamp-based scheme of IEEE 1588 for time synchronization and distribution. For example, the network node 100 may be used in Ethernet networks to forward Ethernet packets 110, including timestamp references (e.g., timestamp packets). Alternatively, the network node 100 may be used in Time Domain Division (TDM) based networks, LANs, Passive Optical Networks (PONs), Digital Subscriber Line (DSL) systems, or any networks that use clocks/timing references to synchronize transmissions. The network node 100 may comprise a plurality of physical layer (PHY) units 120 and MAC units 130 for each of a plurality of ingress ports and a plurality of egress ports, as shown in FIG. 1. The ingress and egress ports may be coupled to other network nodes (not shown) in the network. The network node 100 may also comprise a connection admission control (CAC) block 140, a plurality of switching and forwarding tables 150, a plurality of output queues 160, and one or more output multiplexers (Mux) 170, all of which may be positioned between the ingress ports and the egress ports, for instance in a switch fabric 190. The units and blocks above may process the Ethernet packets 110 (including timestamp references or packets), e.g., at Layer 2, using hardware, software, or both.

At the ingress ports, The PHY units 120 may be configured to receive the Ethernet packet 110, decapsulate/decode the packets at the PHY (Ethernet) layer, and send the packets at the MAC layer to the MAC units 130. The MAC units 130 may decapsulate/decode the packets at the MAC layer and obtain the timestamp references, also referred to herein interchangeably as timestamps. The packets may then be forwarded to the CAC block 140, which may be configured to identify the links or channels that correspond to the packets, e.g., using logical link identifiers (LLIDs) in the packets. The CAC block 140 may also be configured to identify the start of each frame or packet, e.g., using a start of frame delimiter (SFD) in the packet. The switching and forwarding tables 150 may be used to forward the packets based on their destination addresses and/or source addresses, implement address learning, and discard packets with unknown addresses. The output queues 160 may be used to queue or buffer the incoming packets before forwarding. The output multiplexer(s) 170 may be configured to multiplex incoming data into outgoing data blocks. The outgoing packets may then be processed by the MAC units 130 and then the PHY units 120 before being forwarded via the corresponding egress ports, e.g., to another network node. Specifically, the MAC units 130 may encapsulate/encode the packets at the MAC layer and the PHY units 120 may then encapsulate/encode the packets at the PHY or Ethernet layer.

In the network node 100, the time references obtained from the Ethernet packets 110 may be processed to implement time synchronization and distribution, e.g., according to IEEE 1588. The path of the Ethernet packets (at Layer 2) in the network node 100 may be subject to a plurality of impairments that may affect the timing or alignment of the timestamps in the packets, and thus may affect the accuracy of the frequency/phase synchronization and distribution in the network. The timestamp impairments may be caused by possible PHY rate adaptation, e.g., at the PHY units 120. For instance, the PHY units 120 may add or remove typically un-used octets to make up for +/−100 parts per million (ppm), clock operation and/or other link delay variations. The timestamp impairments may also be caused by store-and-forward or cut-through operation selection, e.g., at the MAC units 130. The store-and-forward mode of operation for general packet traffic may contribute to packet delay variation (PDV) for timestamp packets due to the variable size of Ethernet packets. The store-and-forward or cut-through operation selection may require differential treatment of timestamp packets.

The timestamp impairments may also be introduced when CAC parameters are set for general packet traffic, e.g., at the CAC block 140. Setting the CAC parameters may also require differential treatment of timestamp packets. Further, a non-blocking switching fabric and static forwarding of timestamp packets may be required for proper operation of timestamp-based synchronization, e.g., at the switching and forwarding tables 150. Otherwise, more timestamp impairments may be introduced. Traffic management issues may also contribute to the impairments. For instance, to optimize the performance of timestamp packets, differentiated traffic management rules may be required, e.g., at the output queues 160.

Further management issues may need to be addressed. For instance, when previous priority arrangements may not apply anymore, priority rearrangement may allow use of class-of-service (CoS) queuing, and/or additional queuing may be required. Additionally, some packet contention may occur at the output multiplexer(s) 170 since Ethernet packets may have variable sizes. For example, Ethernet packets compliant with IEEE 802.3 standard, which is incorporated herein by reference, may range from about 64 octets to about 2,000 octets in size. This range of packets may comprise actual packet sizes that may be in common use in the industry and comprise more than about 9,600 octets and Ethernet "idle" signaling units (SUs) that comprise about two octets. Thus, the variable delay due to packet and/or idle contention may be close to about 9,600 octets, regardless of the choice of priority scheme. The variable delay may be inversely proportional to the output link bandwidth.

The various impairments above may be additive. Thus, as the timestamps traverse a relatively large number of network nodes, the position or alignment of the timestamps may become less deterministic and affect the accuracy of the timestamp-based synchronization method. The undesired effects of such impairments may not be efficiently handled using current time synchronization and distribution schemes, such as based on IEEE 1588.

Disclosed herein is a system and method to distribute and synchronize a timing reference at Layer 2 using a plurality of timestamps that are transmitted in a controlled and deterministic manner, e.g., within a packet-mode network. The system and method may create and synchronize a periodic time window for the transmissions of timestamps in the outgoing direction of packet-mode participating links, e.g., on the egress of each of the participating nodes within a packet-mode network. The periodic time window may overcome expected timing errors due to the impairments above. A fixed assignment/scheduling may also be applied in the periodic time window for a plurality of timestamps designated for a plurality of network nodes, which may all be transmitted on the same link. The fixed assignment/scheduling may simplify the timing synchronization and distribution for multiple nodes in the network. Such system may improve timing synchronization and distribution in the network and may be used for frequency and/or phase clock adjustment. The implementation details and aspects are further described below. The system and method may be implemented for Ethernet packet-mode links and networks and may also be used in other networks and transport technologies, e.g., other statistically-multiplexed packet-mode networks.

As described above, the timestamp impairments introduced by the network node components may cause misalignment of the timestamps in the transmitted packets between the network nodes. Thus, at least some of the network nodes may receive the timestamps out of order or at delays that may cause errors in the timing (frequency/phase) synchronization and distribution scheme. To prevent the network nodes from receiving the timestamps out of order or with delays, the network nodes may be configured to transmit a plurality of timestamps, e.g., for a plurality of designated network nodes on a link, periodically within a virtual periodic time window. The timestamps may be assigned a plurality of time slots or locations within the periodic time window, and the remaining portion of the periodic time window may be used to transmit other Ethernet packets. The timestamps may be sent within their assigned time slots in the periodic time window by buffering and then forwarding the timestamps appropriately. The length of the periodic time window may be determined to allow sufficient buffering time for the timestamps to prevent or substantially reduce any delays, misalignments, and/or contentions due to the impairments of the network node.

Figure 2:
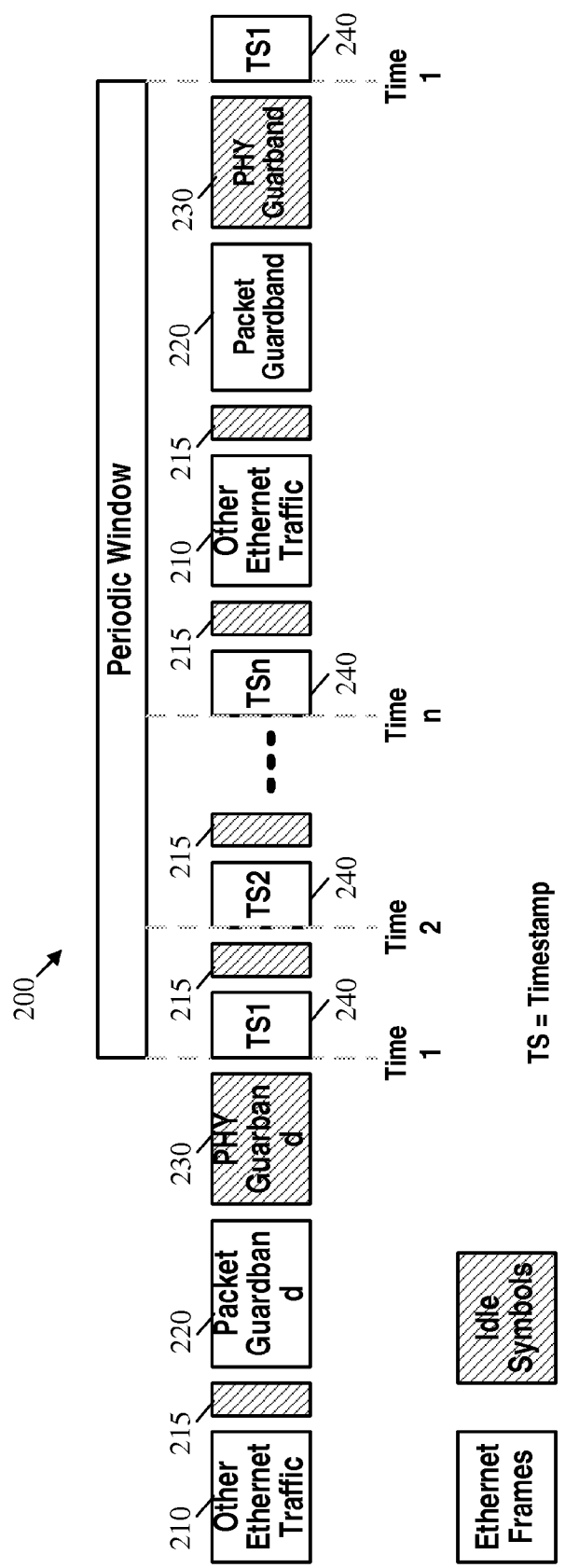
FIG. 2 is a schematic diagram of an embodiment of a periodic time window.

FIG. 2 illustrates an embodiment of a periodic time window 200, which may be a virtual periodic time window used to control and regulate the transmission of the timestamps between the network nodes. The periodic time window 200 may comprise, at the start of the periodic time window 200, a plurality of timestamps or timing references 240 (e.g., TS1, TS2, . . . , TSn, where n is an integer) that may be separated by a plurality of idle symbols 215. The periodic time window 200 may also comprise other Ethernet traffic (e.g., packets) 210, a packet guard-band 220, and a PHY guard-band 230, which may succeed the timestamps 240 in that order (as shown in FIG. 2). The other Ethernet traffic 210 may also be separated from the timestamps 240 and the packet guard-band 220 by idle symbols 215. The periodic time window 200 may be virtual in the sense that the time slots 240, the other Ethernet traffic 210, the packet guard-band 220, and the PHY guard-band 230 may be transmitted in that order periodically, including the idle symbols 215. The transmission of the components of the periodic time window 200 may be repeated substantially periodically from the egress ports of the network nodes based on the determined length or time duration of the periodic time window 200.

The start of the transmissions of the timestamps 240 (or the start of the periodic time window 200) may be determined by the length or time duration of the packet guard-band 220 and the PHY guard-band 230. The packet guard-band 220 may be a time pause where no transmissions may occur. The time duration of the packet guard-band 220 may be determined to be greater than or about equal to the largest Ethernet frame or packet transmission supported by the network, e.g., the largest allowed time to transmit one or a plurality of Ethernet packets continuously without interruption, including the minimum required inter-packet gap between packet transmissions. For example, the minimum required inter-packet gap for Ethernet networks may be equal to about 12 octets. The PHY guard-band 230 may comprise one or more idle symbols that may have a longer time duration of the idle symbols 215. The time duration of the PHY guard-band 230 may be determined to be greater than or about equal to the sum of the minimum required inter-packet gap and at least one maximum possible expected PHY adjustment (e.g., by a PHY unit 120) that may occur. The maximum PHY adjustment may be dependent on the PHY scheme used in the network node, e.g., on the order of about four octets.

Additionally, each of the timestamps 240 may be allocated in a deterministic manner in the periodic time window 200 to a plurality of corresponding time slots. The time slots may be assigned to a plurality of network nodes on the same link in the network. As such, a network node may transmit the timestamps 240 periodically, where each timestamp 240 may be designated according to its positioning in the periodic time window 200 to another corresponding network node on the link. For instance, the timestamps TS1, TS2, . . . , and TSn may be transmitted in that order in the periodic time window 200 and correspond to a plurality of network nodes that comprise a first node, a second node, . . . , and an n-th node, in that same order on the link. Alternatively, the transmitted timestamps 240 may not be arranged in the same sequence of the corresponding nodes on the link if the network nodes are aware of the mapping between the time slots of the timestamp 240 in the periodic time window 200 and the corresponding designated nodes on the link. Each network node that has a designated timestamp 240 may receive the corresponding timestamp 240, use it in the timing synchronization and distribution scheme, and forward the remaining timestamps to the next network node on the link. The network node may also add a timestamp 240 in an allocated time slot in the periodic time window 200 and forward the added timestamp 240 with the remaining traffic to the next network node on the link.

Figure 3:
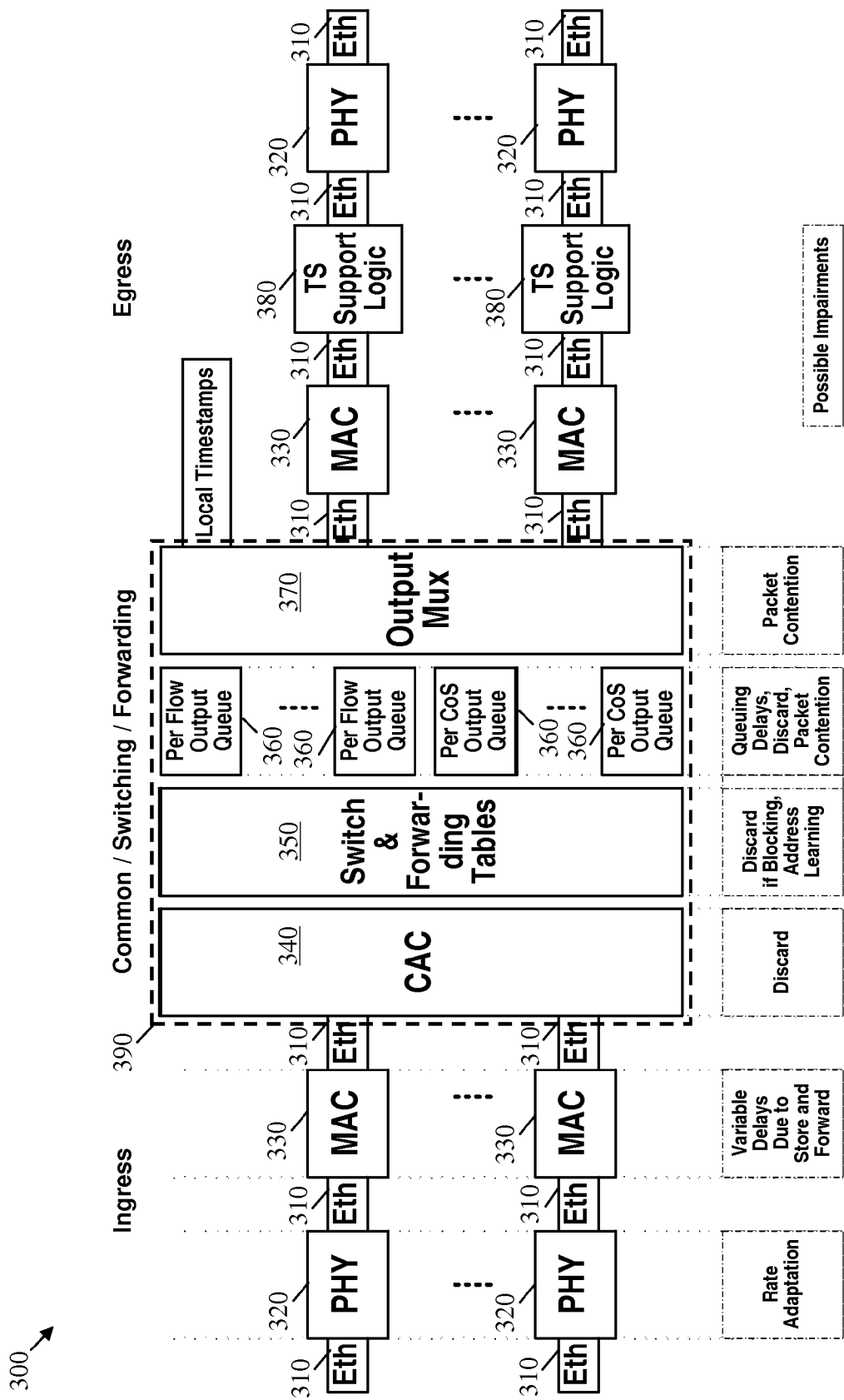
FIG. 3 is a schematic diagram of another embodiment of a network node.

FIG. 3 illustrates an embodiment of a network node 300 that may forward a plurality of timestamps in a network, e.g., at Layer 2. The network node 300 may also transmit a plurality of timestamps designated for a plurality of network nodes on a link in a periodic time window, e.g., the periodic time window 200. For example, the network node 300 may be used in Ethernet networks to forward Ethernet packets 310, including timestamp references (e.g., timestamp packets). Alternatively, the network node 300 may be used in TDM based networks, LANs, PONs, DSL systems, or any networks that use clocks/timing references to synchronize transmissions.

The network node 300 may comprise a plurality of PHY units 320 and MAC units 330 for each of a plurality of ingress ports and a plurality of egress ports, as shown in FIG. 3. The ingress and egress ports may be coupled to other network nodes (not shown) in the network. The network node 300 may also comprise a CAC block 340, a plurality of switching and forwarding tables 350, a plurality of output queues 360, and one or more output multiplexers 370, all of which may be positioned between the ingress ports and the egress ports for instance in a switch fabric 390. The units and blocks above may process the Ethernet packets 310 (including timestamp references or packets), e.g., at Layer 2, using hardware, software, or both. The components above of the network node 300 may be configured substantially similar to the corresponding components of the network node 100.

Additionally, the network node 300 may comprise a plurality of timestamp (TS) support logic units 380 at the egress ports, between the MAC units 330 and the PHY units 320. The TS support logic units 380 may be used to buffer and transmit the timestamps and other Ethernet traffic in the periodic time window to compensate for possible impairments from the components of the network node 300. For instance, the TS support logic units 380 may compensate for possible impairments between the MAC units 330 and the PHY units 320. The TS support logic units 380 may also guarantee that the timestamps in the periodic time window are assigned to the corresponding time slots designated for the corresponding network nodes on the same link. The TS support logic 380 may be implemented using hardware, software, or both.

Figure 4:
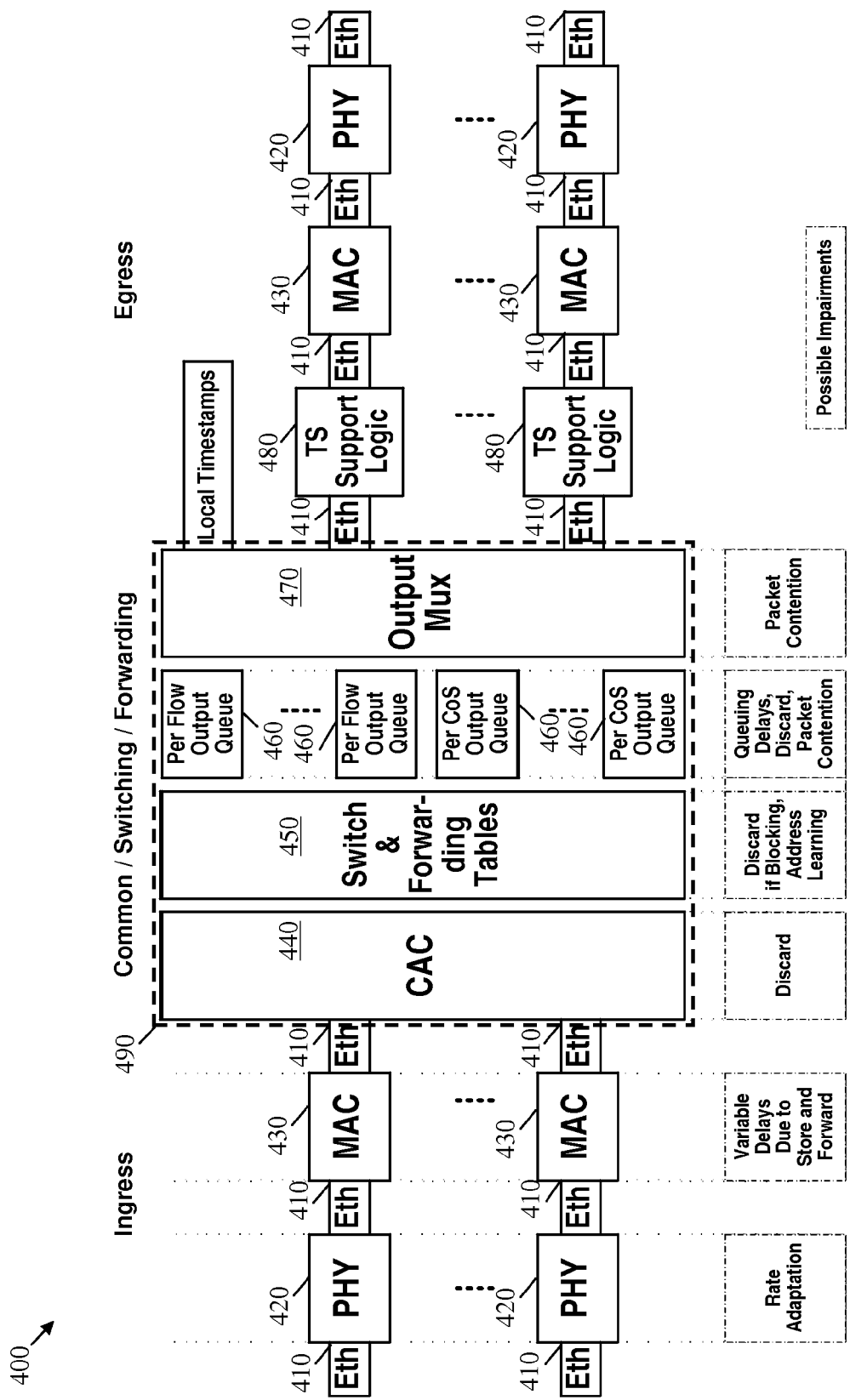
FIG. 4 is a schematic diagram of another embodiment of a network node.

FIG. 4 illustrates an embodiment of another network node 400 that may forward a plurality of timestamps in a network, e.g., at Layer 2. The network node 400 may also transmit a plurality of timestamps designated for a plurality of network nodes on a link in a periodic time window, e.g., the periodic time window 200. The network node 400 may be used in Ethernet networks, TDM based networks, LANs, PONs, DSL systems, or any networks that use clocks/timing references to synchronize transmissions.

The network node 400 may comprise a plurality of PHY units 420 and MAC units 430 for each of a plurality of ingress ports and a plurality of egress ports, as shown in FIG. 4. The ingress and egress ports may be coupled to other network nodes (not shown) in the network. The network node 400 may also comprise a CAC block 440, a plurality of switching and forwarding tables 450, a plurality of output queues 460, and one or more output multiplexers 470, all of which may be positioned between the ingress ports and the egress ports for instance in a switch fabric 490. The components of the network node 400 may process a plurality of Ethernet packets 410 (including timestamp references or packets), e.g., at Layer 2, using hardware, software, or both, and may be configured substantially similar to the corresponding components of the network node 100.

Additionally, the network node 400 may comprise a plurality of TS support logic units 480 at the egress ports, between the output multiplexer(s) 470 and the MAC units 430, which may be configured substantially similar to the TS support logic units 380. The TS support logic units 480 may compensate for possible impairments that may occur between the output multiplexer(s) 470 and the MAC units 430, and may be implemented using hardware, software, or both.

Figure 5:
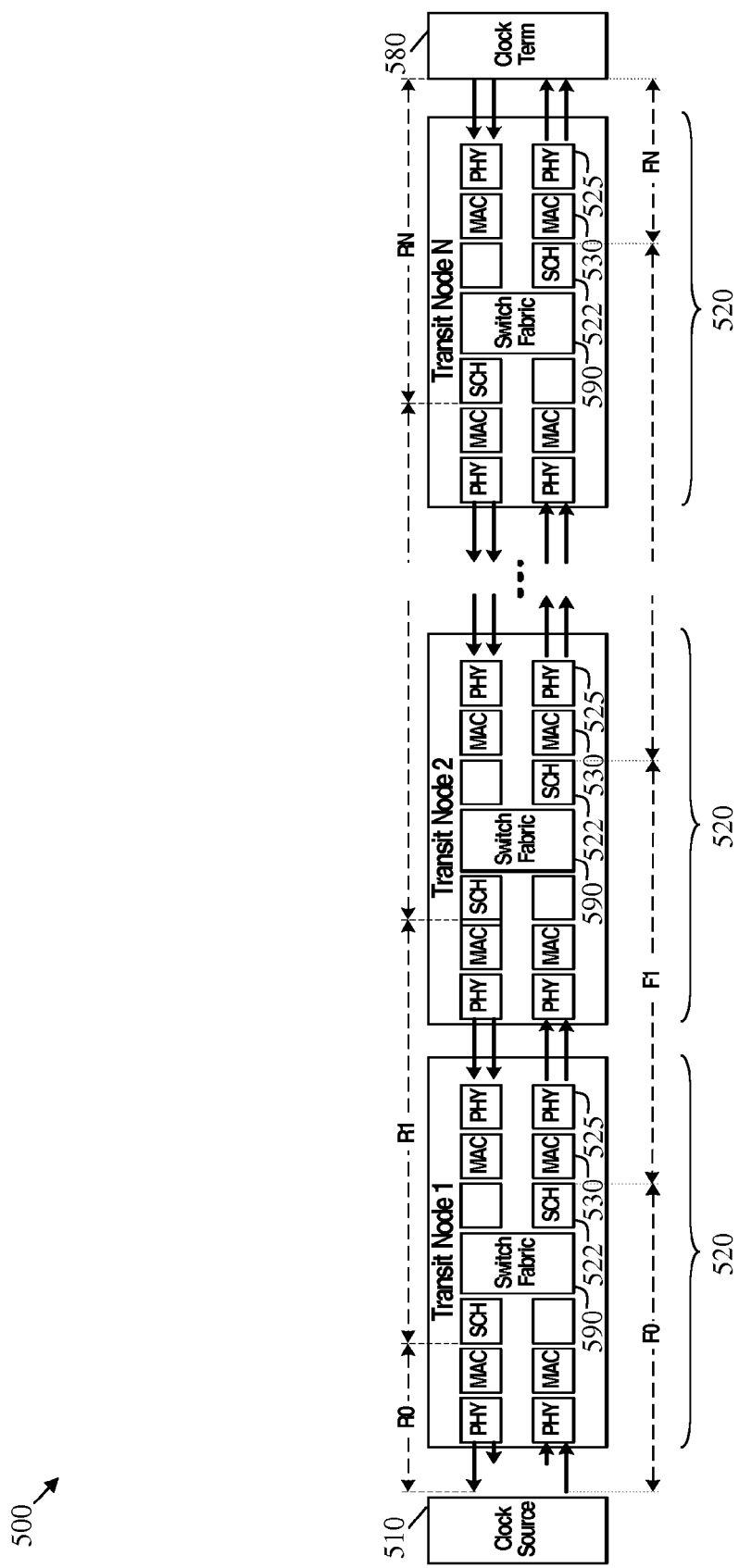
FIG. 5 is a schematic diagram of an embodiment of a timestamp forwarding scheme.

FIG. 5 illustrates an embodiment of a timestamp forwarding scheme 500, which may use the periodic timestamp transmission scheme above, e.g., the periodic time window 200. The timestamp forwarding scheme 500 may be implemented using a plurality of network nodes 520, a clock source node 510, and a clock termination node 580. The network nodes 520 may comprise a plurality of network nodes 400, network nodes 500, and/or similarly configured network nodes. As such, each of the network nodes 520 may comprise a plurality of components similar to the components of the network nodes 400 or 500, including a TS support logic unit (not shown) and a scheduler 522 coupled to the TS support logic unit. For instance, the TS support logic unit and the scheduler 522 may be both positioned between a switch fabric 590 and a MAC unit 530 at each egress port. Alternatively, the scheduler 522 may be positioned between the switch fabric 590 and the MAC unit 530, and the TS support logic unit may be positioned between the MAC unit 530 and a PHY unit 525. The switch fabric 590, the MAC unit 530, and the PHY unit 525 may be configured substantially similar to the switch fabric 190, the MAC unit 130, and the PHY unit 120, respectively. In another embodiment, the TS support logic unit and the scheduler 522 may be both positioned between the MAC unit 530 and the PHY unit 525 at each egress port The clock source node 510 may be configured to generate and send a plurality of timestamps or time references, e.g., in Ethernet packets, in a forward direction to the clock termination node 530 via the network nodes 520. The timestamps may comprise an initial transmission time that may be synchronized with a master clock or absolute clock timing at the clock source node 510. Each of the network nodes 520 may use a corresponding timestamp in a periodic time window to adjust its clock timing. The timestamps may be received and processed by the clock termination node 530, where a reception or arrival time may be added in the timestamps before returning the timestamps back in a reverse direction to the clock source node 510. The clock source node 510 may then receive the returned timestamps and use the initial transmission time and the arrival time in the timestamps to calculate a roundtrip delay, which may then be used to adjust frequency and/or phase timing for the network nodes 520, the clock termination node 530, and possibly the clock source node 510. The offset delay may be about half the sum of a plurality forward offset delays between the nodes (e.g., F0, F1, ..., FN, where N is an integer) and a plurality of reverse offset delays (e.g., R0, R1, ..., RN). In an embodiment, the clock source nodes 510 and/or the clock termination node 530 may be configured substantially similar to the network nodes 520. For instance, any two of the network nodes 520 may act as the clock source node 510 and the clock termination node 530.

The scheduler 522 may be configured to guarantee that Ethernet packets that do not comprise timestamps are buffered in the network nodes 520 and temporarily kept from being forwarded to the egress port to ensure proper alignment of such Ethernet packets in the periodic time window. The scheduler 522 may receive the Ethernet packets that are not timestamp packets from the switch fabric 590, used to buffer or hold the Ethernet packets until the timestamps allocated to the periodic time window are sent out, and then send the Ethernet packets in the allocated time slot (e.g., as the other Ethernet traffic 210).

The TS support logic unit at each of the network nodes 520 may be configured substantially similar to the TS support logic unit 380 or 480. Specifically, the TS support logic unit may identify and classify the timestamp packets on per flow (per link) basis and be used to buffer the timestamp packets until the packets may be sent in the corresponding assigned time slots per flow. Thus, the timestamp packets may be transmitted in a deterministic and periodic manner with no or substantially reduced (minimal) transmission link contention, where some contention with Ethernet idle SUs may still occur. This reduction in transmission link contention may be substantial in comparison to typical possible contentions, e.g., for a sum of about 2,000 Ethernet packets and about 12 idle SUs for IEEE 802.3 compliant Ethernet frames or a sum of about 9,600 Ethernet packets and about 12 idle SUs for standard Ethernet frame transmissions.

Table 1 summarizes some of the improvements achieved using the periodic timestamp transmission scheme. The values in Table 1 show improvements for a plurality of Ethernet type networks, including 10 Megabit per second (Mbps) Ethernet (Eth-10), 100 Mbps or Fast Ethernet (FastE), one Gigabit per second (Gbps) Ethernet (GigE), and 10 Gbps Ethernet (10GE). The values show that, in all the included cases, the positioning of the timestamp packets may be improved by more than about 99 percent.

TABLE 1

Improvements achieved using the periodic timestamp transmission scheme.

| Ethernet Type | Eth-10 | FastE | GigE | 10GE |
|---|---|---|---|---|
| Nominal Link Rate (Mb/s) | 10.00 | 100.00 | 1,000.00 | 10,000.00 |
| Octect Transmission Time (ns) | 800.0 | 80.0 | 8.0 | 0.8 |
| Idle SU | | | | |
| Idle SU Size (octets) | 2 | 2 | 2 | 2 |
| Idle SU Transmission Time (ns) | 1,600.0 | 160.0 | 16.0 | 1.6 |
| IEEE 802.3 Compliant Frames | | | | |
| IEEE 802.3 Compliant Frame Max Size (octets) | 2,000 | 2,000 | 2,000 | 2,000 |
| Minimum IPG Size (octets) | 12 | 12 | 12 | 12 |
| Total Octets | 2,012 | 2,012 | 2,012 | 2,012 |
| Total Transmisstion Time (ns) | 1,609,600 | 160,960 | 16,096 | 1,610 |
| Time Improvement (ns) | 1,608,000 | 160,800 | 16,080 | 1,608 |
| Percent Improvement | 99.90% | 99.90% | 99.90% | 99.90% |
| Industry Standard Jumbo Frames | | | | |
| Industry Standard Jumbo Frame Max Size (octets) | Typically not | | 9,600 | 9,600 |
| Minimum IPG Size (octets) | supported at these | | 12 | 12 |
| Total Octets | rates | | 9,612 | 9,612 |
| Total Transmisstion Time (ns) | | | 76,896 | 7,690 |
| Time Improvement (ns) | | | 76,880 | 7,688 |
| Percent Improvement | | | 99.98% | 99.98% |

Figure 6:
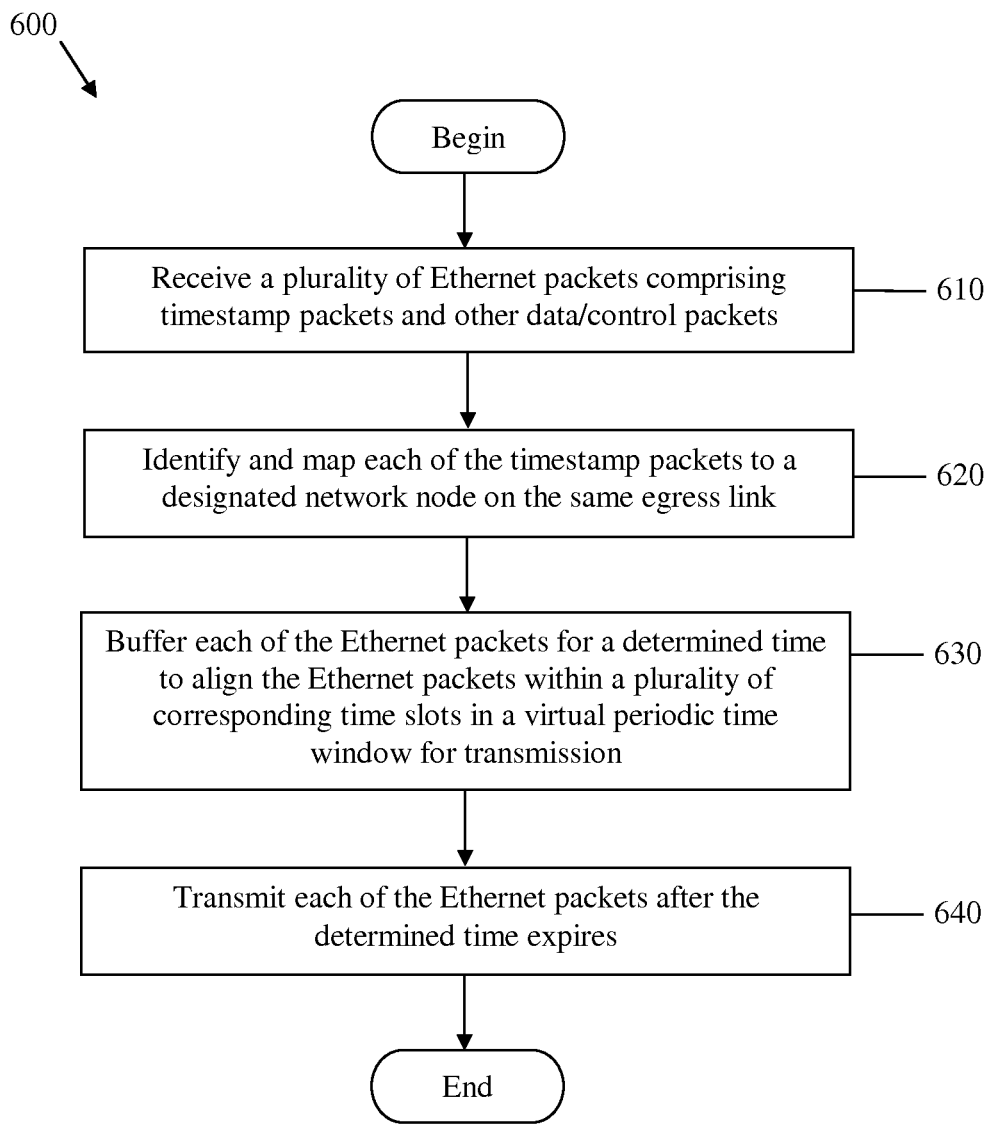
FIG. 6 is a flowchart of an embodiment of a periodic timestamp transmission method.

FIG. 6 illustrates an embodiment of a periodic timestamp transmission method 600 that may be implemented by a network node, such as the network node 300, 400, or 520. The periodic timestamp transmission method 600 may be used to transmit a plurality of timestamps on a link periodically and assigned time slots corresponding to a plurality of nodes on the link. The method 600 may begin at block 610, where a plurality of Ethernet packets comprising timestamp packets and other data/control packets may be received. For instance, the Ethernet packets may comprise Ethernet data packets, other timestamp packets, and idle SUs. At block 620, each of the timestamp packets may be identified and mapped to a designated network node on the same egress link. For instance, the timestamp packets may comprise destination addresses, node identifiers, and/or any other types of identities that may be used to identify the designated corresponding network nodes and the egress link. Alternatively, the timestamp packets may be aligned to a plurality of consecutive time slots that match in sequence the designated network nodes on the link.

At block 630, each of the Ethernet packets may be buffered for a determined time to align the Ethernet packets within a plurality of corresponding time slots in a virtual periodic time window for transmission, e.g., such as the periodic time window 200. The timestamp packets may be buffered, e.g., using the TS support logic unit 380 or 480, to align the timestamp packets at the start of the periodic time window preceding the other data/control packets. Each of the timestamp packets may be buffered to align the timestamp packets in corresponding time slots designated for network nodes designated to receive the corresponding timestamps on the same egress link. Each of the data/control packets may be buffered, e.g., using the scheduler 522, to align the data/control packets in a corresponding time slot subsequent to the time slots of the timestamp packets and preceding one or more guard-bands in the periodic time window to compensate for PHY, MAC, and/or other impairments in the network node that may cause packet contention. At block 640, each of the buffered Ethernet packets may be transmitted after the determined time expires. The method 600 may then end.

Figure 7:
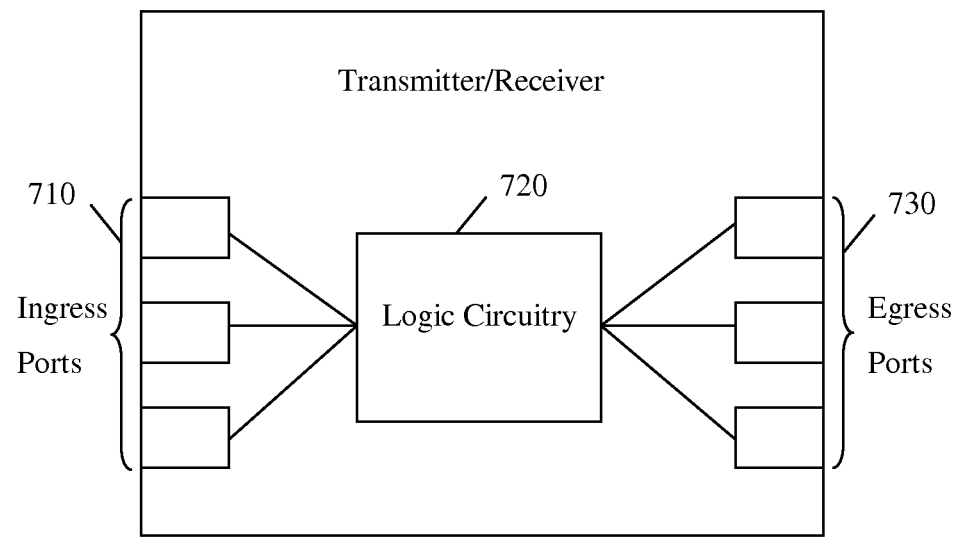
FIG. 7 is a schematic diagram of an embodiment of a transmitter/receiver unit.

FIG. 7 illustrates an embodiment of a transmitter/receiver unit 700, which may be any device that transports packets through a network. For instance, the transmitter/receiver unit 700 may be located in any of the network components described above. The transmitter/receiver unit 700 may comprise one or more ingress ports or units 710 for receiving packets, objects, or Type Length Values (TLVs) from other network components, logic circuitry 720 to determine which network components to send the packets to, and one or more egress ports or units 730 for transmitting frames to the other network components.

Figure 8:
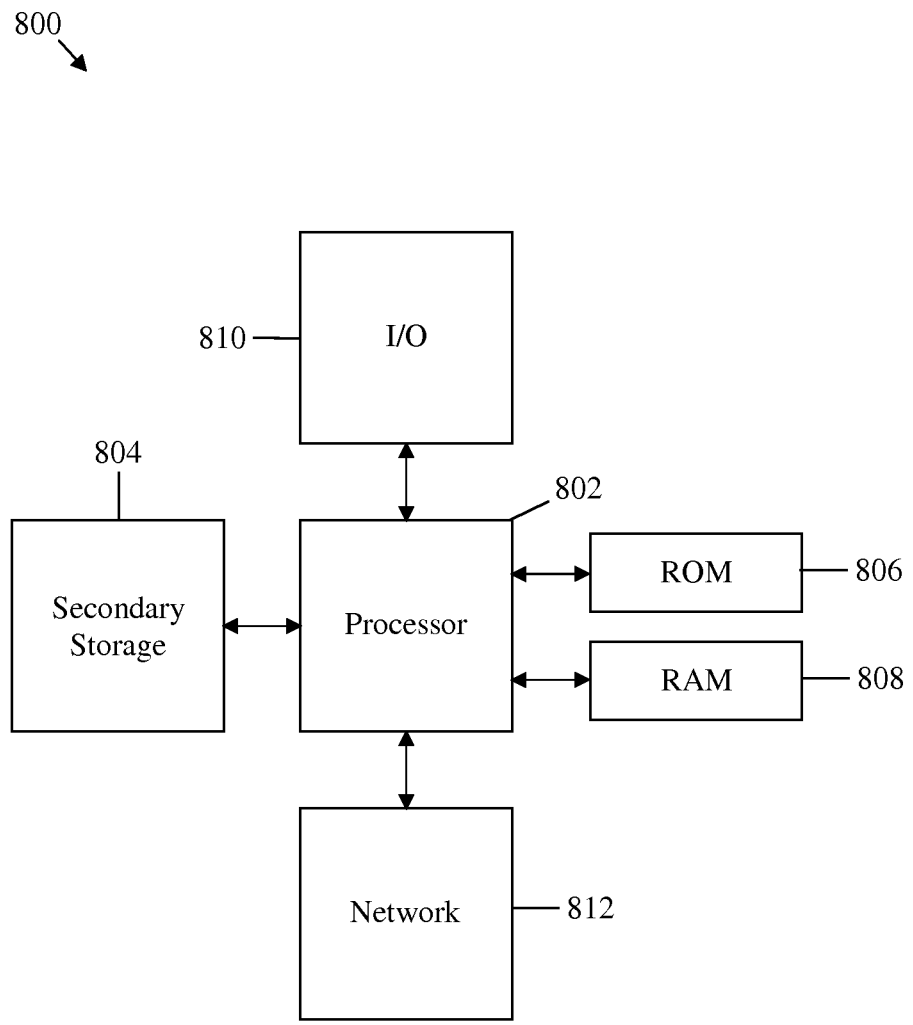
FIG. 8 is a schematic diagram of an embodiment of a general-purpose computer system.

The network components and/or methods described above may be implemented on any general-purpose network component, such as a computer or network component with sufficient processing power, memory resources, and network throughput capability to handle the necessary workload placed upon it. FIG. 8 illustrates a typical, general-purpose network component 800 suitable for implementing one or more embodiments of the components disclosed herein. The network component 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. The processor 802 may be implemented as one or more CPU chips, or may be part of one or more application specific integrated circuits (ASICs).

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to second storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a timestamp support logic component configured to:
identify a plurality of timestamps within a plurality of timestamp packets for a plurality of network nodes on a single link; and
align the timestamp packets in a plurality of corresponding time slots for the network nodes within a periodic transmission time window, wherein each of the timestamp packets has a designated position for its corresponding time slot within the periodic transmission time window; and
a scheduler coupled to the timestamp support logic component,
wherein the scheduler is configured to:
receive a plurality of non-timestamp packets and the timestamp packets;
forward the timestamp packets to the timestamp support logic without forwarding the non-timestamp packets to the timestamp support logic; and
align the non-timestamp packets that do not comprise timestamps in a plurality of time slots subsequent to the corresponding time slots for the timestamp packets in the periodic transmission time window.

2. The apparatus of claim 1, further comprising:
a media access control (MAC) unit coupled to the timestamp support logic component;
a physical layer (PHY) unit coupled to the MAC unit or the timestamp support logic component; and
a switch fabric coupled to the scheduler,
wherein the MAC unit, the PHY unit, the timestamp support logic component, and the scheduler are located at an egress port of the apparatus.

3. The apparatus of claim 2, wherein both the scheduler and the timestamp support logic component are positioned either between the switch fabric and the MAC unit or positioned between the MAC unit and the PHY unit.

4. The apparatus of claim 2, wherein the scheduler is coupled to the timestamp support logic component via the MAC, and wherein the designated position for each of the corresponding time slots within the periodic transmission time window is determined based on the order of the network nodes on the same link.

5. The apparatus of claim 1, wherein the periodic transmission time window comprises the corresponding time slots for the timestamp packets at the start of the periodic transmission time window, the time slots for the non-timestamp packets, a packet guard-band where no transmission occurs subsequent to the time slot of the packets that do not comprise timestamps, and a physical layer (PHY) guard-band that comprises one or more idle symbols subsequent to the packet guard-band, and wherein the PHY guard-band occurs after the packet guard-band within the periodic transmission time window.

6. The apparatus of claim 1, wherein the timestamp packets and the non-timestamp packets are Layer 2 Ethernet data or control packets, and wherein the single link is a Layer 2 Ethernet link.

7. The apparatus of claim 1, wherein the timestamp support logic component is further configured to forward the timestamp packets downstream based upon the alignment of the timestamp packets in the corresponding time slots within the periodic transmission time window, and wherein the scheduler is further configured to forward the timestamp packets downstream based upon the alignment of the non-timestamp packets in the time slots within the periodic transmission time window.

8. The apparatus of claim 1, wherein the scheduler is further configured to not forward the non-timestamp packets to the timestamp support logic component by buffering the non-timestamp packets, and wherein the timestamp support logic component is further configured to not receive the non-timestamp packets.

9. The apparatus of claim 1, wherein the periodic transmission time window comprises an idle symbol positioned between two corresponding time slots for the timestamp packets and a second idle symbol positioned between the corresponding time slots for the timestamp packets and the time slot for the non-timestamp packets.

10. An apparatus comprising:
a timestamp support logic component configured to identify a plurality of timestamps for a plurality of network nodes on a single link and align the timestamps in a plurality of corresponding time slots for the network nodes within a periodic transmission time window, wherein the timestamp for each node has a unique position for its corresponding time slot within the periodic transmission time window; and
a scheduler coupled to the timestamp support logic component and configured to align a plurality of packets that do not comprise timestamps in a plurality of time slots subsequent to the corresponding time slots for the timestamps in the periodic transmission time window,
wherein the periodic transmission time window comprises the time slots for the timestamps at the start of the periodic transmission time window, the time slot for the packets that do not comprise timestamps, a packet guard-band where no transmission occurs subsequent to the time slot of the packets that do not comprise timestamps, and a physical layer PHY guard-band that comprises one or more idle symbols subsequent to the packet guard-band, and
wherein the periodic transmission time window further comprises an idle symbol between each two consecutive time slots for the timestamps, an idle symbol between the time slots for the timestamps and the time slot for the packets that do not comprise timestamps, and an idle symbol between the time slot for the packets that do not comprise timestamps and the packet guard-band.

11. A network component comprising:
a receiver configured to receive a plurality of timestamp packets and a plurality of non-timestamp packets;
a periodic timestamp transmission support logic unit configured to determine one or more buffer times for the timestamp packets in which to align each of the timestamp packets at a position in a periodic transmission time window for a flow;
a scheduler configured to:
determine one or more non-timestamp buffer times to hold the non-timestamp packets such that each of the non-timestamp packets are aligned to a position in the periodic transmission time window that is located after the positions of the timestamp packets; and
buffer the non-timestamp packets such that the non-timestamp packets are not forwarded to the periodic timestamp transmission support logic;
a buffer configured to:
hold each of the timestamp packets until the corresponding buffer times expires; and
hold each of the non-timestamp packets until the corresponding non-timestamp buffer time expires; and
a transmitter configured to transmit the timestamp packets and the non-timestamp packets after the corresponding buffer times expire.

12. The network component of claim 11, wherein the timestamp packets and the non-timestamp packets are transported in a forward direction in a periodic and determined manner along the network nodes on the same link according to the periodic transmission time window, wherein the positions of the timestamp packets are forwarded within the periodic transmission time window according to the order of the network nodes on the same link, and wherein the timestamps are used to adjust frequency timing between the network nodes.

13. The network component of claim 11, wherein the timestamp packets and the non-timestamp packets are transported in a forward direction and then in a reverse direction in a periodic and determined manner along the network nodes on the same link according to the periodic transmission time window, and wherein the timestamps are used to adjust phase timing between the network nodes.

14. The network component of claim 11, wherein the timestamp packets and non-timestamp packets are transmitted within the periodic transmission time window, wherein the period timestamp transmission support logic unit and the scheduler are located within an egress port of the network component, and wherein the scheduler is further configured to forward the timestamp packets to the periodic timestamp transmission support logic.

15. The network component of claim 11, wherein the transmitter is further configured to transmit an idle symbol between the positions of two timestamp packets within the periodic transmission time window and transmit a second idle symbol between the position of the non-timestamp packet within the periodic transmission time window and a packet guard-band.

16. A method comprising:
receiving a plurality of timestamp packets;
mapping each of the timestamp packets to a corresponding designated network node on a same egress link;
buffering each of the timestamp packets for a determined time to align the timestamp packets within a plurality of corresponding time slots in a periodic time window for transmission; and
transmitting each of the timestamp packets after the determined time expires,
wherein the corresponding time slots are allocated within the periodic time window for transmission according to the order of the corresponding designated network nodes on the same egress link associated with the timestamp packets, and
wherein the timestamp packets are transmitted within the periodic time window for transmission prior to transmitting a plurality of non-timestamp packets.

17. The method of claim 16, wherein the timestamp packets are mapped to the corresponding designated network nodes by aligning the timestamp packets to a plurality of consecutive time slots that match a sequence of the designated network nodes located on the same egress link.

18. The method of claim 16, wherein the timestamp packets are buffered to allow a packet guard-band where no transmissions may occur, and wherein the packet guard-band has a time duration greater than or equal to a largest network supported Ethernet packet or packet transmission including a minimum required inter-packet gap between packet transmissions.

19. The method of claim 18, wherein the timestamp packets are further buffered to allow a physical layer (PHY) guard-band that has a time duration greater than or equal to the sum of the minimum required inter-packet gap and at least one maximum possible expected PHY adjustment.

20. The method of claim 16, wherein an idle symbol is located in between the corresponding time slots within the periodic time window for transmission.

21. The method of claim 19, wherein the PHY guard-band is positioned after the packet guard-band within the periodic time window for transmission, and wherein the end of the periodic time window for transmission occurs at the end of the PHY guard-band.

* * * * *